United States Patent
Jones, IV et al.

(10) Patent No.: US 7,599,282 B2
(45) Date of Patent: *Oct. 6, 2009

(54) WIDE FREQUENCY OFFSET CORRECTION USING ENCODED INTERBURST PHASE DIFFERENCES

(75) Inventors: Vincent K. Jones, IV, Redwood City, CA (US); James M. Gardner, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 481 days.

This patent is subject to a terminal disclaimer.

(21) Appl. No.: 11/101,029

(22) Filed: Apr. 6, 2005

(65) Prior Publication Data

US 2005/0175114 A1 Aug. 11, 2005

Related U.S. Application Data

(63) Continuation of application No. 09/598,068, filed on Jun. 20, 2000, now Pat. No. 6,930,989.

(51) Int. Cl.
*H04J 11/00* (2006.01)
*H04B 7/216* (2006.01)
*H04K 1/10* (2006.01)

(52) U.S. Cl. ............ 370/208; 370/335; 370/342; 375/260

(58) Field of Classification Search .......... None
See application file for complete search history.

(56) References Cited

U.S. PATENT DOCUMENTS

| | | | |
|---|---|---|---|
| 5,274,629 A | 12/1993 | Helard et al. ............ 370/208 |
| 5,282,222 A | 1/1994 | Fattouche et al. ......... 375/1 |
| 5,602,835 A | 2/1997 | Seki et al. ............... 370/206 |
| 5,625,651 A | 4/1997 | Cioffi ..................... 375/354 |
| 5,732,113 A * | 3/1998 | Schmidl et al. .......... 375/355 |
| 5,828,710 A | 10/1998 | Beale ..................... 375/324 |
| 5,909,470 A | 6/1999 | Barratt et al. ............ 375/324 |
| RE36,430 E | 12/1999 | Halbert-Lassalle et al. .. 370/204 |
| 6,097,776 A | 8/2000 | Mesiwala ................ 375/355 |
| 6,158,041 A | 12/2000 | Raleigh et al. ........... 714/792 |

(Continued)

FOREIGN PATENT DOCUMENTS

EP 0 823 804 A2 2/1998

(Continued)

OTHER PUBLICATIONS

Rohling et al., "Differential amplitude phase shift keying (DAPSK)—A new modulation method for DTVB", 1995, International Broadcasting Convention, Conference Publication No. 413.

(Continued)

*Primary Examiner*—Melanie Jagannathan
(74) *Attorney, Agent, or Firm*—Edell, Shapiro & Finnan, LLC

(57) ABSTRACT

Systems and methods for wide frequency offset synchronization are provided. A synchronization data sequence is encoded onto a series of OFDM frequency domain bursts as interburst phase differences between training symbols included within the successive bursts. The interburst phase differences may also encode system configuration information. This technique may be used in conjunction with other synchronization techniques to greatly extend the frequency acquisition range achievable with low cost analog components.

20 Claims, 7 Drawing Sheets

U.S. PATENT DOCUMENTS

| | | | |
|---|---|---|---|
| 6,208,695 B1 | 3/2001 | Klank et al. | 375/260 |
| 6,252,908 B1 | 6/2001 | Tore | 375/259 |
| 6,275,543 B1 | 8/2001 | Petrus et al. | 375/324 |
| 6,282,167 B1 | 8/2001 | Michon et al. | 370/203 |
| 6,285,654 B1 | 9/2001 | Marchok et al. | 370/208 |
| 6,314,082 B1 | 11/2001 | Malmgren | 370/208 |
| 6,373,861 B1 | 4/2002 | Lee | 370/503 |
| 6,381,251 B1 | 4/2002 | Sano et al. | 370/480 |
| 6,452,981 B1 | 9/2002 | Raleigh et al. | 375/299 |
| 6,459,679 B1 | 10/2002 | Kim | 370/208 |
| 6,487,253 B1 | 11/2002 | Jones, IV et al. | 375/260 |
| 6,501,730 B1 | 12/2002 | Katsumoto | 375/244 |
| 6,546,055 B1 | 4/2003 | Schmidl et al. | 375/244 |
| 6,549,592 B1 | 4/2003 | Jones | 375/354 |
| 6,618,352 B1 | 9/2003 | Shirakata et al. | 370/203 |
| 6,618,452 B1 | 9/2003 | Huber et al. | 375/343 |
| 6,707,856 B1 | 3/2004 | Gardner et al. | 375/260 |

OTHER PUBLICATIONS

John G. Proakis, "Digital Communications", $3^{rd}$ Edition, Ch. 5: Optimum Receivers for the Additive White Gaussian Noise Channel, pp. 274-278.

U.S. Appl. No. 09/469,715, filed Dec. 21, 1999, entitled "Wide Range Frequency Offset Estimation in OFDM Systems," by J. Gardner et al. pp. 1-22 & Figs. 1-6.

IEEE Standard 802.11a-1999, Part 11: Wireless LAN Medium Access Control (MAC) and Physical Layer (PHY) specifications, High-Speed Physical Layer in the 5 GHz Band. Sep. 1999, pp. 1-83.

Nogami et al., "A Frequency and Timing Period Acquisition Technique for OFDM Systems," 1995 IEEE, pp. 1010-1015.

Schmidl et al. "Low-Overhead, Low-Complexity (Burst) Synchronization for OFDM," Stanford University, Stanford, CA 94305.

Sandell et al. "Timing and Frequency Synchronization in OFDM Systems Using the Cyclic Prefix," Luleå University of Technology, S-971 87, Luleå Sweden.

Jones et al., "Improved OFDM channel identification", 1999, U.S. Appl. No. 09/234,929.

Jones et al., "Differential OFDM using multiple receiver antennas", 1999, U.S. Appl. No. 09/282,589.

John G. Proakis, "Digital Communications", $3^{rd}$ Edition, Ch. 5: Optimum Receivers for the Additive White Gaussian Noise Channel, pp. 274-278, 1995.

Schmidl et al. "Low-Overhead, Low-Complexity (Burst) Synchronization for OFDM," Stanford University, Stanford, CA 94305, Jun. 1996.

Sandell et al. "Timing and Frequency Synchronization in OFDM Systems Using the Cyclic Prefix," Luleå University of Technology, S-971 87, Luleå Sweden, 1995.

\* cited by examiner

# WIDE FREQUENCY OFFSET CORRECTION USING ENCODED INTERBURST PHASE DIFFERENCES

STATEMENT OF RELATED APPLICATIONS

The present application is a continuation of U.S. patent application Ser. No. 09/598,068 filed Jun. 20, 2000 now U.S. Pat. No. 6,930,989. The contents of U.S. patent application Ser. No. 09/598,068 are incorporated herein by reference in their entirety.

The present application is also related to the subject matter of the following four U.S. Patent Applications:

U.S. patent application Ser. No. 09/245,168, filed on Feb. 5, 1999, entitled SYNCHRONIZATION IN OFDM SYSTEMS.

U.S. patent application Ser. No. 09/244,754, filed on Feb. 5, 1999, entitled ENHANCED SYNCHRONIZATION BURST FOR OFDM SYSTEMS.

U.S. patent application Ser. No. 09/469,715, filed on Dec. 21, 1999, entitled WIDE RANGE FREQUENCY OFFSET ESTIMATION IN OFDM SYSTEMS.

U.S. patent application Ser. No. 09/415,014, filed on Oct. 7, 1999, entitled TRANSMISSION OF SYSTEM CONFIGURATION INFORMATION.

The contents of each of these related patent applications are incorporated herein by reference in their entirety.

BACKGROUND OF THE INVENTION

The present invention relates to digital communications and more particularly to synchronization of frequency between a receiver and a transmitter.

In an OFDM (Orthogonal Frequency Division Multiplexing) communication system, a channel to be used for communication is divided into subchannels that are orthogonal to one another in the frequency domain. Data is communicated in a series of time domain bursts. To form each time domain burst an IFFT is applied to a group of frequency domain symbols and a cyclic prefix is added to the transform result prior to transmission. Transmission may involve conversion of the transform result to an analog signal, conversion of the analog signal to an intermediate frequency (IF), then upconversion to a desired selectable carrier frequency prior to final amplification and propagation across a transmission medium. Upconversion is typically achieved by mixing the IF signal with a variable frequency oscillator signal. The carrier frequency is varied by varying the oscillator frequency.

On the receiver end, preamplification is followed by downconversion to IF from the carrier frequency, again by mixing with the output of a variable frequency oscillator. The resulting IF signal is typically converted to a baseband digital symbol sequence. The cyclic prefix is removed and an FFT is applied to recover the original frequency domain symbols.

For successful communication, the transmitter and receiver should have a precise shared understanding of the transmission frequency. In the exemplary system described above, this means that the variable frequency oscillators of the transmitter and receiver should be locked to each other. Imprecision with respect to the transmission frequency will cause inaccurate recovery of the OFDM symbols. To maintain system performance, it is desirable to always maintain frequency offset between a transmitter and a receiver to within 1% of the spectral width occupied by a single frequency domain OFDM symbol. When the receiver initially acquires the transmitter frequency, it is desirable that the synchronization system tolerates and corrects as wide as possible a frequency offset between the transmitter and receiver oscillators. This allows the use of much lower cost analog components for the receiver oscillator.

U.S. patent application Ser. No. 09/245,168, filed on Feb. 5, 1999, and entitled SYNCHRONIZATION IN OFDM SYSTEMS discloses various systems and methods for synchronizing the receiver frequency of an OFDM receiver to the transmission frequency of an OFDM transmitter. One such system provides a supplemental cyclic prefix that follows the cyclic prefix used to orthogonalize the frequency domain subchannels. At the receiver end, this supplemental cyclic prefix is correlated to the corresponding time domain symbols within the principle portion of the time domain burst in order to compute a fine frequency offset, that is a fractional component of the frequency offset as measured in OFDM frequency domain symbol widths. Once the fine offset is computed, it may be corrected by use of appropriate control signals to the receiver variable frequency oscillator. This procedure corrects for frequency offsets that are a fraction of a frequency domain symbol width but after this correction the received frequency may still be offset from the transmit frequency by an integer number of frequency domain symbol widths.

The procedure for correction of this integer frequency offset takes advantage of frequency domain structure within each OFDM burst. Each OFDM burst includes regularly spaced training symbols having known predetermined values. The training symbols facilitate estimation of the channel response at the receiver and correction of the integer frequency offset. The integer frequency offset is corrected by finding the frequency alignment that causes the received symbol values at the known training positions to correlate strongly between successive bursts.

It will be appreciated, however, that there is a limit to the acquisition range for this integer frequency offset correction technique. If the frequency offset is greater than the spacing between training symbols, then this offset correction technique may lock to a false alignment that differs from the correct alignment by an integer multiple of the training symbol spacing. The acquisition range is thus $$\pm \frac{N}{2v}$$

tones where N is the number of frequency domain symbols in a single OFDM burst and v is the number of frequency domain symbols reserved for training.

Consider a millimeter wave application where the operating frequency is 28 GHz and where use of low cost analog components may cause an initial frequency offset of 10 parts per million (ppm) or 280 KHz. A typical value, however, for $$\frac{N}{2v}$$

may be a small as 4 frequency domain symbol widths. In a representative system where the overall bandwidth of the OFDM system is 6 MHz and where N is 256, this provides an acquisition range of only approximately ±94 KHz or approximately ±3 ppm.

What is needed is a system for OFDM frequency synchronization that can correct for wide offsets that exceed the spacing between training symbols within the frequency domain bursts.

SUMMARY OF THE INVENTION

Systems and methods for wide frequency offset synchronization are provided by virtue of one embodiment of the present invention. A synchronization data sequence is encoded onto a series of OFDM frequency domain bursts as interburst phase differences between training symbols included within the successive bursts. The interburst phase differences may also encode system configuration information. This technique may be used in conjunction with other synchronization techniques to greatly extend the frequency acquisition range achievable with low cost analog components.

A first aspect of the present invention provides a method for synchronizing a second node to a first node in an OFDM communication system. The method includes: at the second node, receiving a series of frequency domain bursts from the first node where the frequency domain bursts includes training symbols, measuring interburst phase differences for the training symbols, and determining a wide frequency offset based on misalignment of a sequence of the interburst phase differences relative to a known sequence.

A second aspect of the present invention also provides a method of synchronizing a second node to a first node in an OFDM communication system. The method includes: developing at the first node, a series of frequency domain bursts, where frequency domain bursts include training symbols at a predetermined sequence of positions within the bursts, and including synchronization information in the frequency domain bursts encoded as a series of interburst phase differences for successive training symbol positions of the sequence, and transmitting the frequency domain bursts to the second node.

Further understanding of the nature and advantages of the invention herein may be realized by reference to the remaining portions of the specification and the attached drawings.

DESCRIPTION OF SPECIFIC EMBODIMENTS

Figure 1:
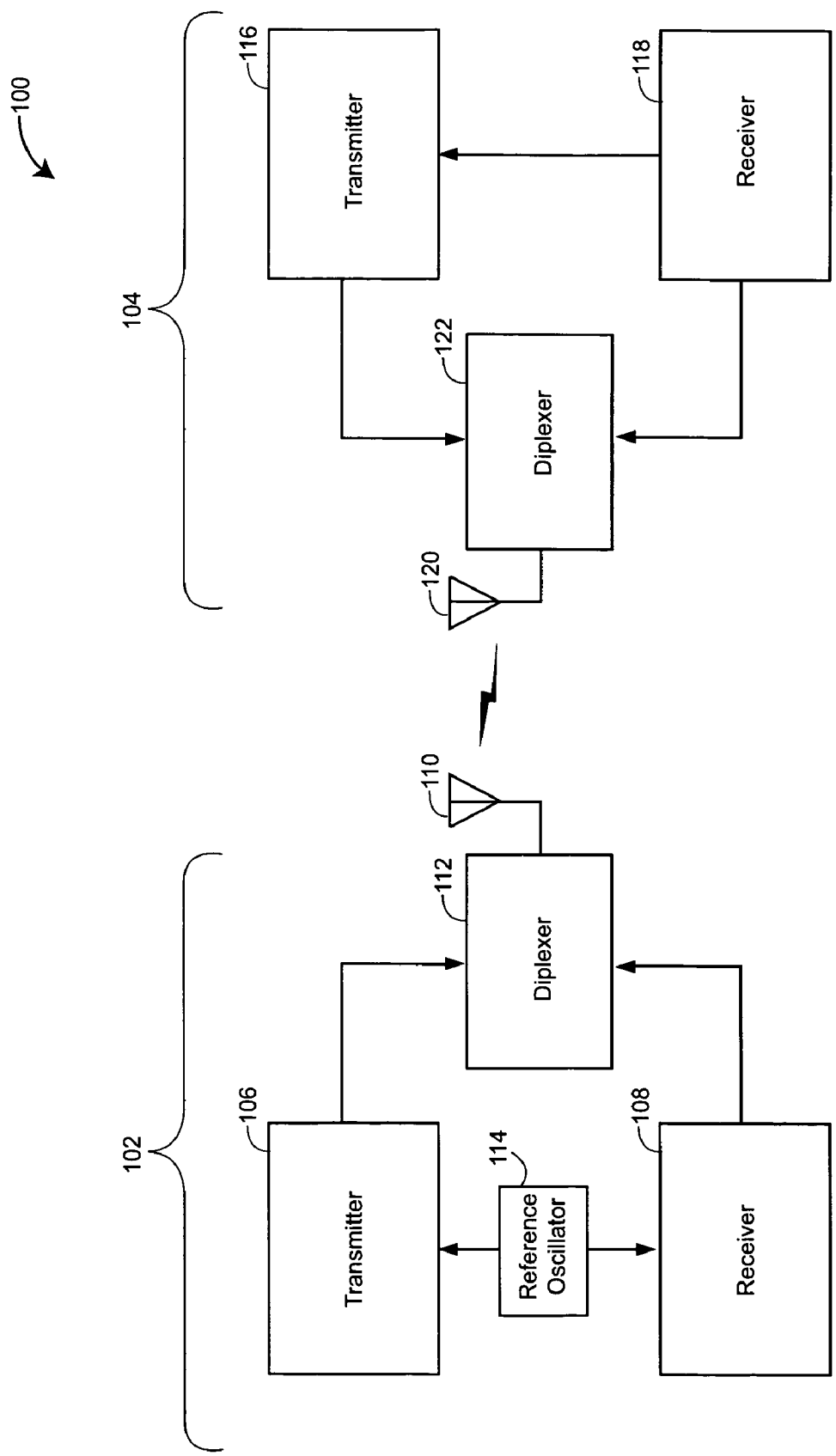
FIG. 1 depicts a point to point communication system suitable for implementing one embodiment of the present invention.

FIG. 1 depicts a point to point OFDM communication system 100 suitable for implementing one embodiment of the present invention. The present invention is, however, not limited in application to point to point communication systems and may also be used in, e.g., point to multipoint communications systems, broadcast systems, peer to peer systems, etc. System 100 includes a first node 102 and a second node 104. First node 102 includes a transmitter 106 and a receiver 108. Transmitter 106 and receiver 108 share use of an antenna 110 by employing a diplexer 112. Diplexer 112 is employed in FDD (frequency division duplexing) where transmitter 106 and receiver 108 can operate simultaneously but using different frequencies. The present invention also applies to TDD (time division duplexing) systems where transmitter 106 and receiver 108 employ the same frequency but at different times. Diplexer 112 is then unnecessary. A reference oscillator 114 provides a frequency standard to both transmitter 106 and receiver 108.

Second node 104 includes a transmitter 116 and a receiver 118. Transmitter 116 and receiver 118 share use of an antenna 120 by employing a diplexer 122. Instead of employing its own reference oscillator, second node 104 synchronizes its operation frequency to the signal received from first node 102. Receiver 118 synchronizes to its received signal and generates a synchronization signal to control the operation frequency of transmitter 116.

Figure 2:
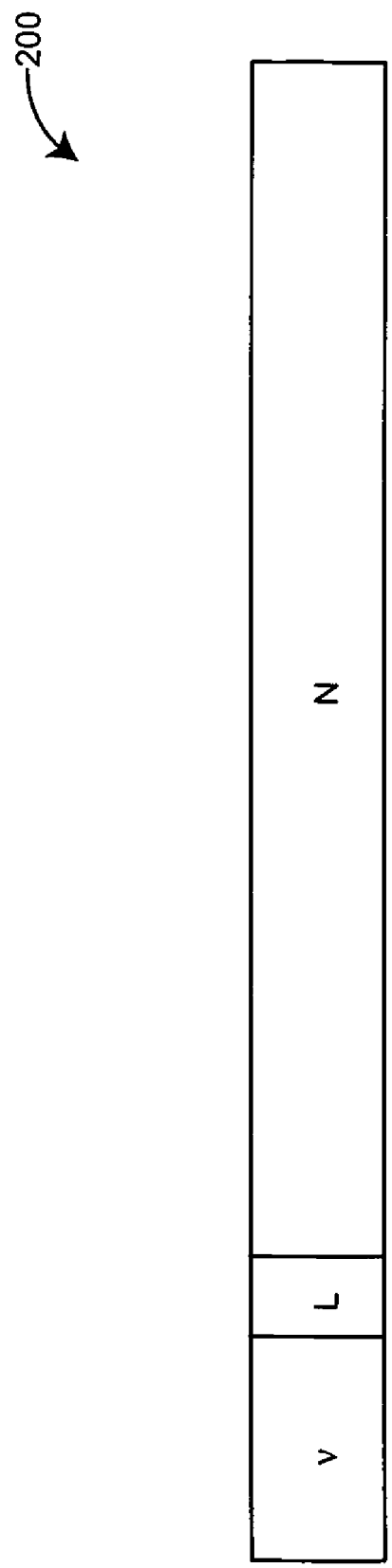
FIG. 2 depicts time domain structure of an OFDM burst as exploited by one embodiment of the present invention.

The frequency synchronization process described herein takes advantage of both time domain and frequency domain structure of OFDM bursts transmitted from first node 102 to second node 104. FIG. 2 depicts a time domain structure 200 of an OFDM burst as exploited by one embodiment of the present invention. Each burst includes a segment holding N symbols representing a result of applying the Inverse Fast Fourier Transform (IFFT) to an N symbol frequency domain burst. Furthermore, each burst includes a v symbol cyclic prefix followed by an L symbol supplemental cyclic prefix. The N symbols of the IFFT result follow the cyclic prefixes. Together, the cyclic prefix and supplemental cyclic prefix replicate the last v+L symbols of the N symbol IFFT result. The v symbol cyclic prefix assures reception of the frequency domain symbols input into the IFFT within orthogonal subchannels even in the face of dispersive channel conditions. The L symbols of the supplemental cyclic prefix are used to facilitate synchronization.

Figure 3:
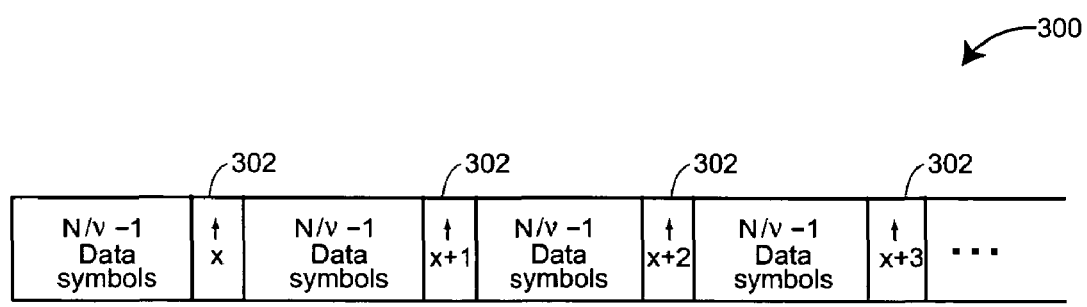
FIG. 3 depicts frequency domain structure of an OFDM burst as exploited by one embodiment of the present invention.

FIG. 3 depicts a portion of an OFDM frequency domain structure 300 exploited for synchronization purposes according to one embodiment of the present invention. The frequency domain structure includes v blocks, each block including one training symbol 302 and a group of N/v−1 data symbols. Training symbols 302 have known magnitude values and are used to estimate the response of the channel between first node 102 and second node 104. According to one embodiment of the present invention, training symbols 302 carry phase information useful to the receiver in establishing synchronization and system configuration.

Frequency offset, as measured in frequency domain symbol widths, may be understood as including an integer portion and a fractional portion:

$$f_{offset} = f_{int} + \Delta f_{offset}.$$

The synchronization process described herein first corrects for the fractional portion of the frequency offset and then corrects for the integer portion.

Figure 5:
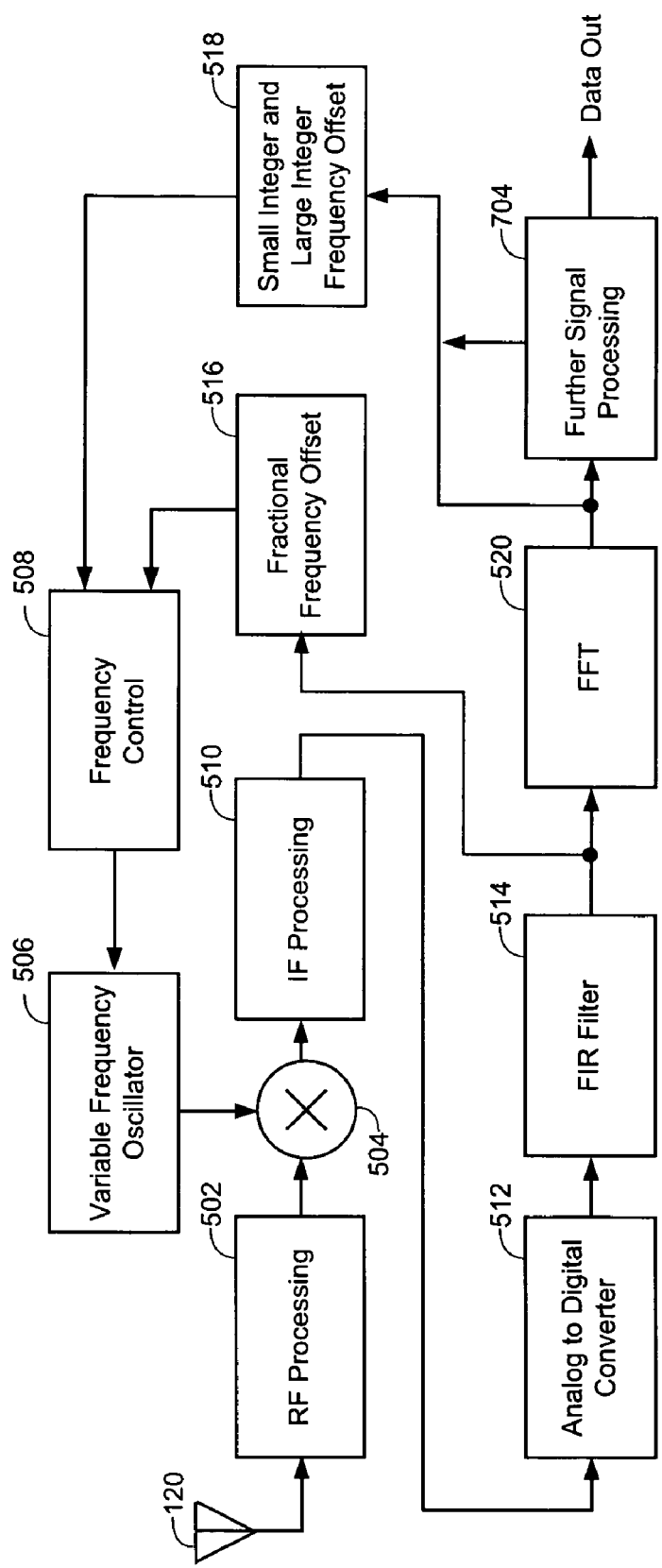
FIG. 5 depicts a receiver according to one embodiment of the present invention.

FIG. 5 depicts internal structure of receiver 118 of second node 104. Signals received via antenna 120 first go to a RF processing block 502 where low noise preamplification and filtering occur. A mixer 504 downconverts the processed RF signal to an intermediate frequency (IF) by mixing with the output of a variable frequency oscillator 506. The output frequency of variable frequency oscillator 506 as set by a frequency control block 508 determines the receive frequency of receiver 118. The IF signal is input into an IF processing block 510 which filters and amplifies at an IF frequency. There may be further downconversion to baseband or downconversion may be inherent in the operation of an analog to digital converter 512 which converts its input signal to a baseband series of complex symbol values. The baseband symbols are input to an FIR filter 514. The output of FIR filter 514 is a series of time domain OFDM bursts.

Figure 4:
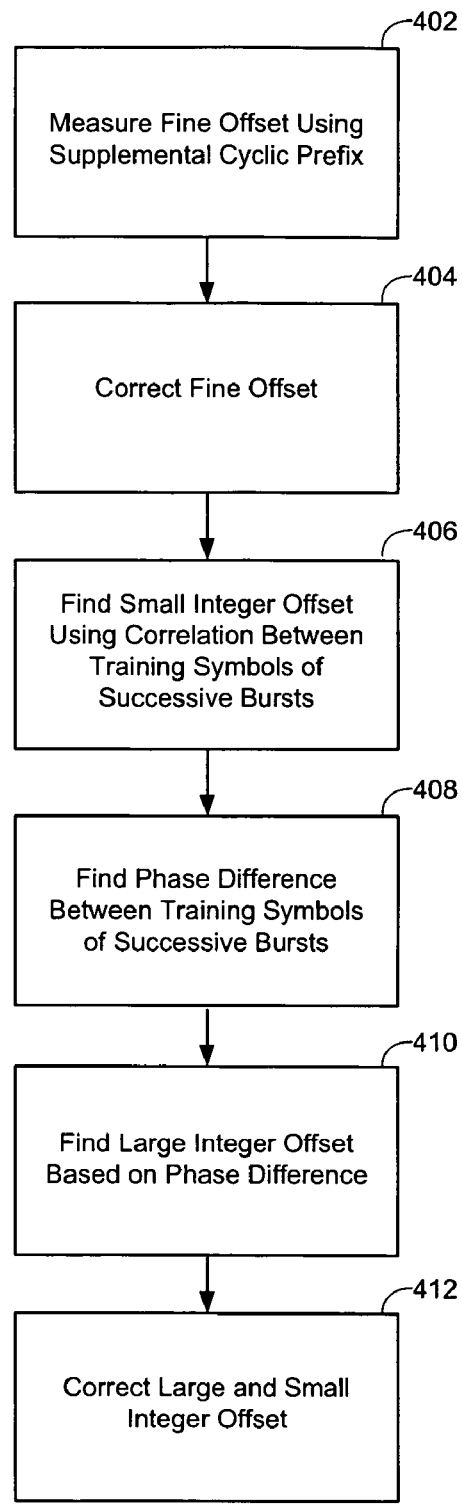
FIG. 4 is a flowchart describing steps of synchronization according to one embodiment of the present invention.

FIG. 4 is a flowchart describing steps of a frequency synchronization process according to one embodiment of the present invention. At step 402, a fractional frequency offset processing block 516 evaluates a cost function based on the fractional frequency offset. The cost function is evaluated using the following expression:

$$d(\delta) = \sum_{k=\delta-L+1}^{\delta} x^*(k)x(k+N)$$

where x(k) is a received time domain symbol value within structure 200, and where δ represents the position of the first of the N symbols in each time domain OFDM burst as determined by a timing synchronization process such as the one described in U.S. patent application Ser. No. 09/245,168. The cost function will repeat every N+v+L samples. The fractional frequency offset cost function should be averaged over successive bursts by:

$$\overline{d}(\delta) = \sum_{k=0}^{K} d(\delta + k(N+v+L))$$

The fractional frequency offset is then given by:

$$\Delta f_{\text{offset}} = \frac{1}{2\pi N} \tan^{-1} \frac{\operatorname{Im}\overline{d}(\delta_0)}{\operatorname{Re}\overline{d}(\delta_0)}$$

where $\delta_0 = \arg \min_\delta \overline{d}(\delta)$

At step 404, frequency control block 508 adjusts the output frequency of variable frequency oscillator 506 to correct the fractional frequency offset determined in step 402. An integer offset may however remain.

The integer offset is determined by computing a correlation between frequency domain symbol values of successive bursts that occupy positions reserved for training symbols. The magnitude of the correlation signal is used to determine small integer offset, i.e., a component of the integer offset that is less than the spacing between training symbols in structure 300. Phase information encoded onto the training symbols is used to determine wide frequency offset, i.e., how many groups of N/v symbols are in the integer offset.

An FFT block 520 removes the cyclic prefix from successive OFDM time domain bursts output by FIR filter 514 and converts the bursts to the frequency domain. An integer frequency offset processor 518 determines the small and large integer offsets based on the frequency domain symbols output by FFT block 520.

The small integer offset is determined by first forming:

$$Y(n) = \sum_{k=0}^{K} X^*(n,k) X(n,k+1)$$

where X(n,k) is the received frequency domain value at frequency domain symbol n and burst k and K is a number of successive bursts over which Y(n) is evaluated, e.g., 40.

A cost function, $e_j$, is calculated over groups of N/v frequency domain symbols by $$e_j = \sum_{n \in J_j} Y(n) \text{ where e.g., } N/v = 8 \text{ and } j \in [-4, 3]$$

where $J_j$ is the set of v frequency indices corresponding to the training symbol positions, and equally spaced by N/v:

$$J_j = \left[ jj + \frac{N}{v} \ldots \right]$$

Small integer offset is determined based on a magnitude of a cost function determined by correlating successive pairs of bursts.

$$f_{\text{small}} = \arg\max_j |e_j|^2$$

The determination of large frequency offset is dependent on synchronization information encoded in the phase relationships between training symbols. There are two sets of training symbols A and B that are used in alternate bursts. Between each training symbol of burst A and the corresponding training symbol of group B, there is a phase difference Δφ or ($D_0(n)$). Alignment to a sequence derived from the predefined sequence of $D_0$ values is determined at the receiver end to estimate large integer frequency offset. In addition to the synchronization sequence, $D_0$ values may also encode system configuration information.

Figure 6:
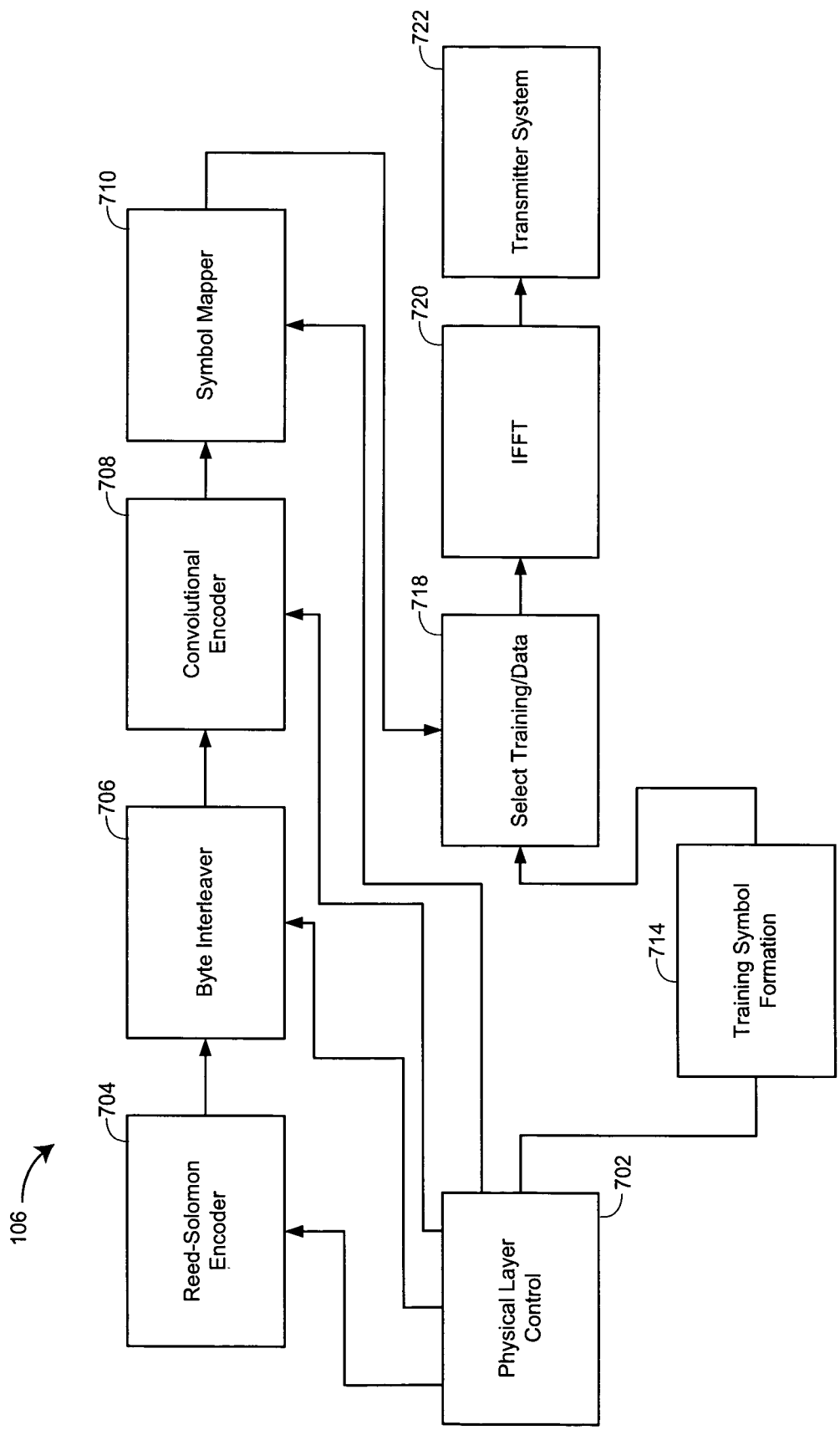
FIG. 6 depicts a transmitter according to one embodiment of the present invention.

FIG. 6 depicts elements of transmitter 106 according to one embodiment of the present invention. A physical layer processor 702 coordinates overall transmitter operation, defines encoding and modulation parameters, and arranges for their transmission. Data to be transmitted is input to a Reed-Solomon encoder 704. Data output by Reed-Solomon encoder 704 is in the form of Reed-Solomon codewords. Each codeword includes 2*t parity bytes where t is defined by a configuration signal from physical layer control processor 702.

Reed-Solomon codewords are forwarded to a byte interleaver 706. Byte interleaver 706 reorders the encoded bytes to improve resistance to burst channel impairments. The time span over which byte interleaver 706 reorders bytes is known as the interleaver depth and is controlled by an interleaver depth signal generated by physical layer control processor 702.

A convolutional encoder 708 applies a convolutional code. The degree of redundancy introduced by convolutional encoder 708 may be varied by periodic deletions of its output bits. Variation in the frequency of deletions implements a variation in the convolutional encoder rate, i.e., the ratio of input bits to output bits. The rate is controlled by a signal from physical layer control processor 702.

The output of convolutional encoder 708 is then input into a symbol mapper 710. Symbol mapper 710 maps bits to symbols in accordance with a currently defined symbol constellation. Symbol mapper 710 may employ a variety of constellations. The currently employed constellation is determined by a constellation size control signal generated by physical layer control processor 702. The output of symbol mapper 710 then consists of a stream of data symbols for inclusion within frequency domain OFDM bursts.

Physical layer control processor 702 also outputs system configuration information to be encoded onto training symbols. In one embodiment, a single byte indicates a current constellation size, convolutional code rate, interleaver depth, and number of Reed-Solomon parity bytes. The mapping between possible values of these parameters and byte values within a single system configuration byte is presented in the following table:

| Parameter | Possible Values | Bit Mapping |
|---|---|---|
| Constellation Size | 4 | 00XX XXXX |
|  | 16 | 01XX XXXX |
|  | 64 | 10XX XXXX |
|  | 256 | 11XX XXXX |
| Code Rate | 1/2 | XX00 XXXX |
|  | 2/3 | XX01 XXXX |
|  | 5/6 | XX10 XXXX |
|  | 7/8 | XX11 XXXX |
| Interleaver Depth | 4 | XXXX 000X |
|  | 6 | XXXX 001X |
|  | 9 | XXXX 010X |
|  | 12 | XXXX 011X |
|  | 18 | XXXX 100X |
|  | 24 | XXXX 101X |
|  | 28 | XXXX 110X |
|  | 36 | XXXX 111X |
| RS Parity | 14 | XXXX XXX0 |
|  | 20 | XXXX XXX1 |

There are two sets of QPSK symbols that are used for the training symbols. These two sets of training symbols, set A and set B, are developed by training symbol formation block 714 and sent in alternating OFDM bursts. Set A is selected to have a low Peak-to-Mean Power Ratio (PMPR). Set B is a modulated version of set A. The modulation is based on a synchronization sequence and the configuration data.

The synchronization sequence, p, is a binary, maximal length sequence of length v. This binary sequence defines a set of 0 or 90 degree phase shifts in set A. That is, if p(k)=0, C(k)=A(k), and if p(k)=1, C(k)=A(k)*exp(j*π/2).

The data sequence is formed from the 8 bits of configuration data described in system configuration byte. These data bits are differentially encoded to form sequence d, and mapped to 0 or 180 degree phase shifts, and then applied to C(k) to form B(k). Thus, B(k)=C(k) for 0<k<v-8; B(i+v-8)= C(i+v-8) for i=0 . . . 7, p(i)=0, and B(i+v-8)=−C(i+v-8) for i= 0 . . . 7, p(i)=1.

The output of differential coding block 716 consists of sets of training symbols for inclusion within bursts of type A and B. The sets of training symbols are output in an alternating pattern, i.e., bursts k, k+2, k+4 . . . use set A while bursts k+1, k+3, . . . use set B.

A selection block 718 then forms successive bursts of type A and B by combining the frequency domain data symbols output by symbol mapper 710 and the training symbols output by differential coding block 716. In one embodiment, the training symbols are evenly spaced through the burst. Selection block 718 forms the bursts and outputs successive frequency domain OFDM bursts to an IFFT block 720. IFFT block 720 converts the frequency domain burst to the time domain and affixes cyclic prefixes. A transmitter system 722 converts the baseband digital signal to analog, upconverts the signal to an intermediate frequency (IF), amplifies and otherwise processes the IF signal, upconverts the IF signal to a radio frequency (RF), amplifies and otherwise processes the RF signal, and transmits the RF signal via an antenna 724.

There is a synchronization sequence of interspersed phase differences for the training symbols described by the expression:

$$D_0 = Z^*_A(n) Z_B(n) \forall n \in 1 \ldots v;$$

Sequence alignment is based on the differences between successive $D_0$ values from training symbol position to training symbol position. To facilitate the determination of the large integer frequency offset, integer frequency offset processor 518 maintains not only the $D_0$ values but also a series of $D_1$ values representing these position to position phase differences. The $D_1$ sequence is derived from the $D_0$ sequence by:

$$D_1(n) = D_0(n) D^*_0(n+1) \forall n \in 1 \ldots v,$$

where $D_0(1) = D_0(v)$

A sequence of $D_2$ values is also maintained as follows:

$$D_2(n) = |Re(D_1(n))| + i|Im(D_1(n))| \forall n \in 1 \ldots v$$

Figure 7:
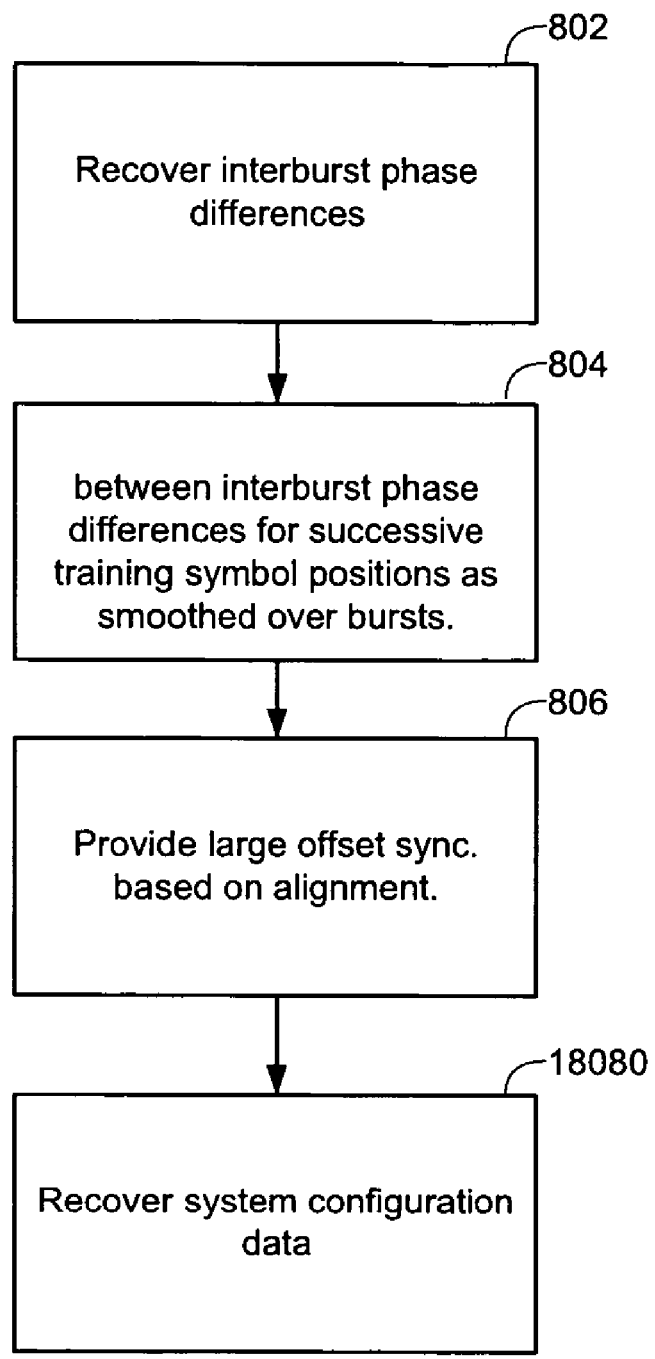
FIG. 7 is a flowchart describing steps of determining wide frequency offset according to one embodiment of the present invention.

Estimates of the $D_0$, $D_1$, $D_2$ sequences are formed by integer frequency offset processor 518 over K bursts using the received training tone values $T_1$. FIG. 7 is a flowchart describing steps of determining large integer frequency offset according to one embodiment of the present invention. At step 802, the $D_0$ values are estimated for each burst k by:

$$\hat{D}_0(n,k) = X^*(n,k) X(n,k+1) \forall n \in 1 \ldots v, \text{ and } \forall k$$

At step 804, the $D_1$ values are estimated by:

$$\hat{D}_1(n) = \frac{1}{K-1} \sum_{k=1}^{K-1} \hat{D}_0(n,k) \hat{D}_0(n+1,k)$$

where $\hat{D}_0(1) = \hat{D}_0(v)$.

As can be seen, the $D_1$ values are smoothed over bursts. The $D_2$ values are then estimated based on:

$$\hat{D}_2(n) = |Re(\hat{D}_1(n))| + i|Im(\hat{D}_1(n))| \forall n \in 1 \ldots v,$$

The large integer frequency offset is determined by calculating costs for each possible alignment of the received estimate $D_2$ values to the $D_2$ values derived from the known $D_0$ sequence. The cost function is:

$$dl(r) = \sum_{M=0}^{v-1} \hat{D}_2(M+r) D_2(M)$$

where $r = [-v/2 \ldots v/2]$

At step 806, the large integer offset is determined based on the maximum value of dl(r) as follows:

$$dl_{max} = \underset{r}{\arg\max}\, dl(r)$$

$$f_{large} = \frac{N}{v} dl_{max}$$

At step 808, system configuration data is retrieved from the last 8 training symbols. First, the order of the alternating training symbols sets A and B must be determined. This order can be determined by finding:

$$\sum_{n \in J_{config}} \mathrm{Im}(\hat{D}_1(n = dl_{max})) \mathrm{Im}(D_1(n)) > 0$$

where $J_{config}$ is the set of training symbols carrying configuration information.

If this inequality is true than A precedes B while if the inequality is not true then B precedes A. After the order of the alternating training symbol sets is determined, the values of the bits of the system configuration byte can then be determined.

For each of the positions in $J_{config}$, the configuration data can be found by comparing the phase of $D_1$ to the known synchronization sequence, C(K). If $D_1$(K) is within 90 degrees of C(K), then the configuration data for the corresponding symbol is 0, otherwise the data is 1.

The total integer frequency offset is then the total of the large integer and small integer offsets. Referring again to FIG. 4, at step 412, frequency control block 508 adjusts the operating frequency of variable frequency oscillator 506 to correct for both the large and small integer offsets as determined by integer frequency offset processing block 518. The receive frequency of receiver 118 is then aligned to the transmit frequency of transmitter 106. The output of variable frequency oscillator 506 can then serve as a frequency synchronization signal to transmitter 116 so that transmitter 116's transmission frequency will then be locked to the transmission frequency of transmitter 106. A signal processing block 522 performs further signal processing on the frequency domain training and data symbols to recover transmitted data. This processing includes estimation of the channel response and correction of the received data symbols for the estimated channel response.

It is understood that the examples and embodiments described herein are for illustrative purposes and that various modifications or changes in light thereof will be suggested to persons skilled in the art and are to be included within the spirit and purview of this application and scope of the appended claims and their full scope of equivalents. For example, the present invention may be applied to wired systems rather than wireless systems. Also, it will be appreciated that the present invention may be applied to receiver systems that incorporate input from multiple antennas. All publications, patents and patent applications cited herein are hereby incorporated by reference.

We claim:

1. In an orthogonal frequency division multiplexed (OFDM) communication system, a method for synchronizing a second node to a first node, the method comprising:
   at the second node, receiving a series of OFDM symbols from the first node, each OFDM symbol including training subcarriers;
   measuring inter-OFDM-symbol phase differences for the training subcarriers of received OFDM symbols; and
   determining a wide frequency offset based on misalignment of a sequence of the measured inter-OFDM-symbol phase differences relative to a known sequence,
   wherein at least some of the received OFDM symbols further include data subcarriers at subcarrier positions that do not include training subcarriers.

2. A method as recited in claim 1, further comprising:
   using the training subcarriers of received OFDM symbols to estimate a channel response.

3. A method as recited in claim 1, further comprising:
   determining system configuration information based on the measured inter-OFDM-symbol phase differences,
   wherein the system configuration information includes at least one of constellation size, code rate, interleaver depth, and RS parity.

4. A method as recited in claim 1, further comprising:
   adjusting receiver frequency responsive to the determined wide frequency offset.

5. A method as recited in claim 1, wherein the sequence of inter-OFDM-symbol phase differences includes inter-OFDM-symbol phase differences for particular training subcarrier frequency domain positions.

6. In an orthogonal frequency division multiplexed (OFDM) communication system, a method of synchronizing a second node to a first node, the method comprising:
   forming at the first node, a series of OFDM symbols, the OFDM symbols including training subcarriers at a predetermined sequence of positions within the OFDM symbols, the forming arranged such that synchronization information is included in the formed OFDM symbols, the synchronization information encoded as a series of inter-OFDM-symbol phase differences for successive training subcarrier frequency domain positions of the sequence; and
   transmitting the OFDM symbols to the second node,
   wherein at least some of the formed OFDM symbols include data subcarriers at subcarrier positions that do not include training subcarriers.

7. A method as recited in claim 6, wherein the forming of OFDM symbols is in the frequency domain, the method further comprising:
   converting the OFDM symbols formed in the frequency domain from the frequency domain to the time domain.

8. A method as recited in claim 6, wherein the forming is arranged such that at least one of the series of inter-OFDM-symbol phase differences further encodes system configuration information, the system configuration information including at least one of constellation size, code rate, interleaver depth, and RS parity.

9. A method as recited in claim 8, wherein the forming is arranged such that the training subcarriers are evenly spaced in the frequency domain within the OFDM symbols.

10. In an orthogonal frequency division multiplexed (OFDM) communication system, an apparatus for synchronizing a second node to a first node, the apparatus comprising:
    a receiver system arranged to receive a series of OFDM symbols from the first node, the OFDM symbols including training subcarriers; and
    a frequency offset processor arranged to measure inter-OFDM-symbol phase differences for training subcarriers of received OFDM symbols, the frequency offset processor further arranged to determine a wide frequency offset based on misalignment of a sequence of the inter-OFDM-symbol phase differences relative to a known sequence, wherein at least some of the received OFDM symbols include data subcarriers at subcarrier positions that do not include training subcarriers.

11. An apparatus as recited in claim 10, further comprising:
a channel estimation processor arranged to use the training subcarriers of received OFDM symbols to estimate a channel response.

12. An apparatus as recited in claim 10, further comprising:
a system configuration processor arranged to determine system configuration information based on the inter-OFDM-symbol phase differences, the system configuration information including at least one of constellation size, code rate, interleaver depth, and RS parity.

13. An apparatus as recited in claim 10, further comprising:
a frequency control block arranged to adjust receiver frequency of the receiver system responsive to the wide frequency offset.

14. An apparatus as recited in claim 10, wherein the sequence of inter-OFDM-symbol phase differences includes inter-OFDM-symbol phase differences for particular training subcarrier frequency domain positions.

15. In an orthogonal frequency division multiplexed (OFDM) communication system, an apparatus for synchronizing a second node to a first node, the apparatus comprising:
a training subcarrier forming system arranged to form at the first node, a series of OFDM symbols that include training subcarriers at a predetermined sequence of frequency domain positions within the OFDM symbols; and
a synchronization sequence generation system arranged to include synchronization information in the OFDM symbols, the synchronization information encoded as a series of inter-OFDM-symbol phase differences for successive training subcarrier frequency domain positions of the sequence,
wherein at least some of the formed OFDM symbols include data subcarriers at subcarrier positions that do not include training subcarriers.

16. An apparatus as recited in claim 15, wherein the training subcarrier forming system is arranged to form the OFDM symbols in the frequency domain, the apparatus further comprising:
a transform block arranged to convert formed OFDM symbols from the frequency domain to the time domain.

17. An apparatus as recited in claim 15, wherein at least one of said series of inter-OFDM-symbol phase differences further encodes system configuration information, the system configuration information including at least one of constellation size, code rate, interleaver depth, and RS parity.

18. An apparatus as recited in claim 17, wherein the training subcarriers are evenly spaced in the frequency domain in the formed OFDM symbols.

19. In an orthogonal frequency division multiplexed (OFDM) communication system, an apparatus for synchronizing a second node to a first node, the apparatus comprising:
means for receiving a series of OFDM symbol from the first node, the OFDM symbol including training subcarriers;
means for measuring inter-OFDM-symbol phase differences for the training subcarriers; and
means for determining a wide frequency offset based on misalignment of a sequence of the inter-OFDM-symbol phase differences relative to a known sequence,
wherein at least some of the OFDM symbols include data subcarriers at subcarrier positions that do not include training subcarriers.

20. An apparatus as recited in claim 19, further comprising:
means for estimating a channel response using the training subcarriers of received OFDM symbols.

\* \* \* \* \*

UNITED STATES PATENT AND TRADEMARK OFFICE
CERTIFICATE OF CORRECTION

PATENT NO. : 7,599,282 B2  Page 1 of 1
APPLICATION NO. : 11/101029
DATED : October 6, 2009
INVENTOR(S) : Jones, IV et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 812 days.

Signed and Sealed this

Fourteenth Day of December, 2010

David J. Kappos
*Director of the United States Patent and Trademark Office*